March 28, 1939. H. L. JOHNSTON 2,151,852
FOOD HANDLING APPARATUS
Filed Feb. 23, 1934 4 Sheets-Sheet 2
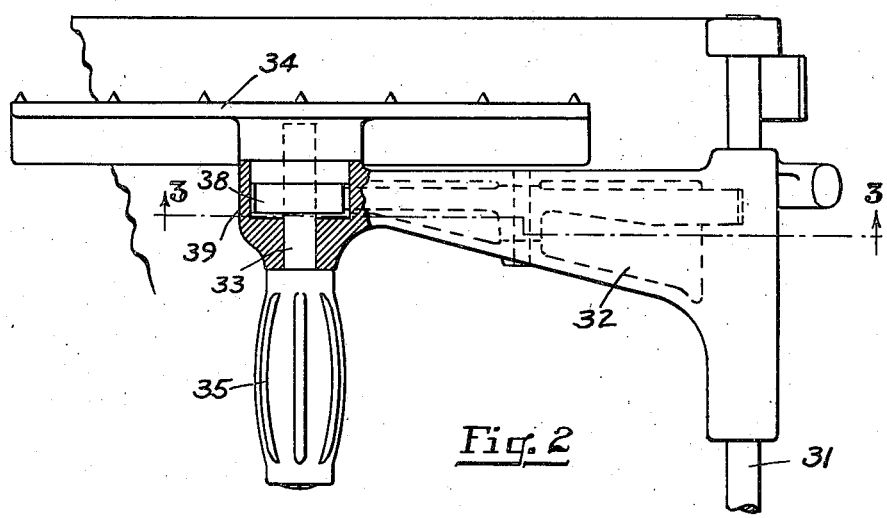
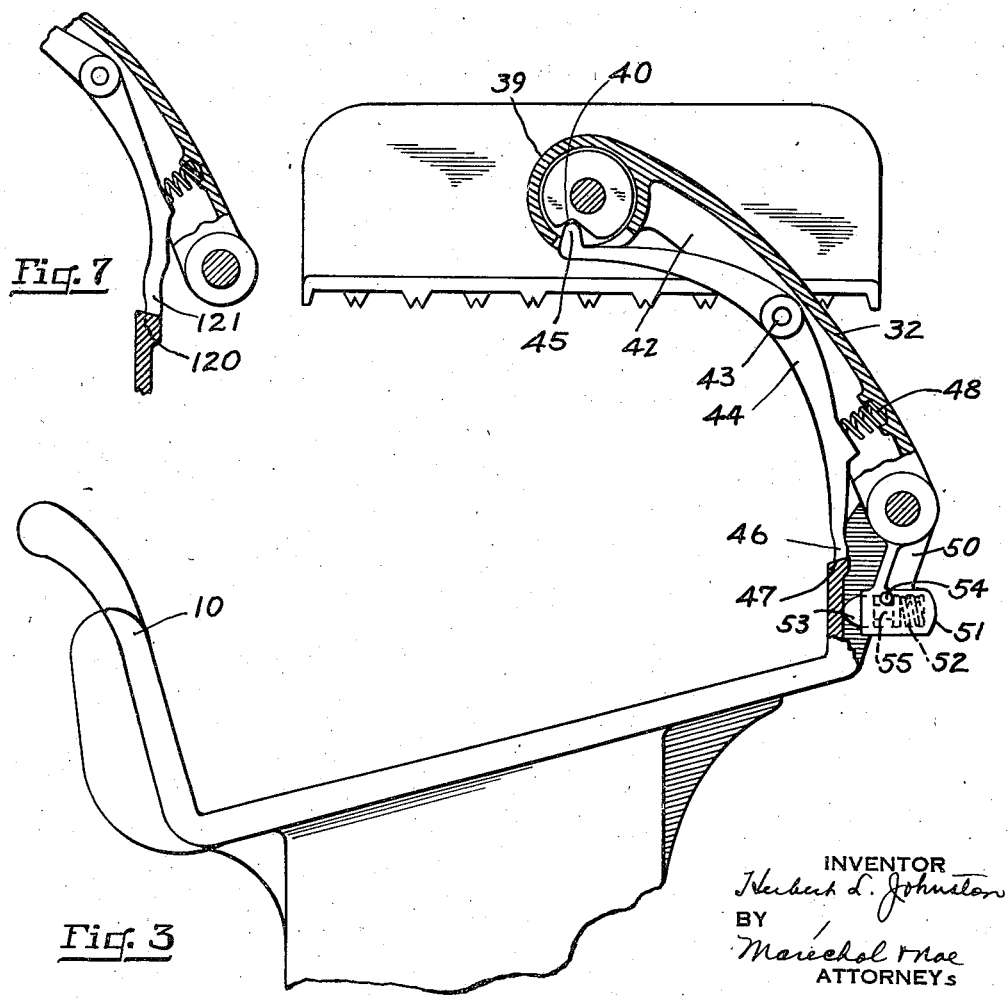
INVENTOR
Herbert L. Johnston
BY
Marechal + Mae
ATTORNEYs March 28, 1939. H. L. JOHNSTON 2,151,852
FOOD HANDLING APPARATUS
Filed Feb. 23, 1934 4 Sheets-Sheet 3

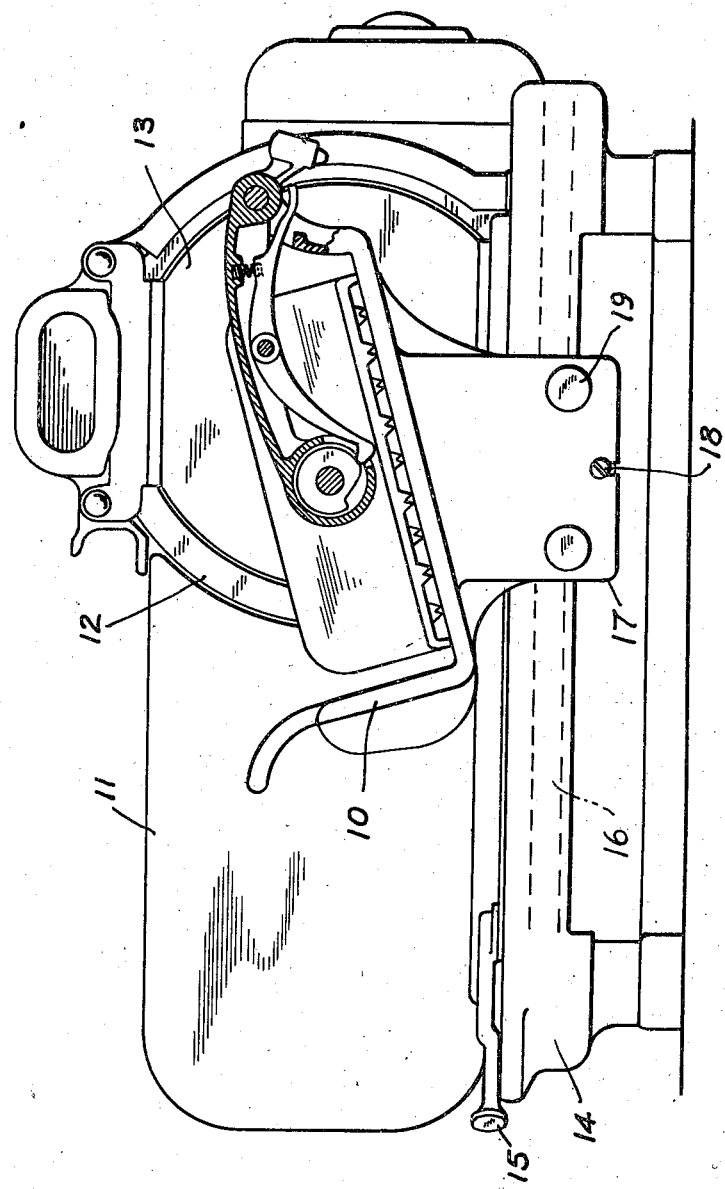

INVENTOR
Herbert L. Johnston
BY
Maréchal Mae
ATTORNEYS

March 28, 1939. H. L. JOHNSTON 2,151,852
FOOD HANDLING APPARATUS
Filed Feb. 23, 1934 4 Sheets-Sheet 4

INVENTOR
Herbert L. Johnston
BY
Maréchal & Noe
ATTORNEYS

Patented Mar. 28, 1939

2,151,852

UNITED STATES PATENT OFFICE 2,151,852

FOOD HANDLING APPARATUS

Herbert L. Johnston, Troy, Ohio, assignor to The Hobart Manufacturing Company, Troy, Ohio, a corporation of Ohio Application February 23, 1934, Serial No. 712,579

10 Claims. (Cl. 146—102)

This invention relates to food handling equipment and more particularly to a slicing machine which is provided with a supporting carriage for receiving foodstuffs and with a pusher plate operable in the carriage for advancing the material being sliced toward the cutting knife.

It is the principal object of the invention to provide a construction of pusher plate that tends to remain in preadjusted position, either in operative position in contact with the material in the supporting carriage, or in inoperative position out of the carriage.

It is a further object to provide, in conjunction with the means tending to retain the pusher plate in contact with the material being sliced, a means for automatically advancing such material into cutting relation with the knife as it is sliced.

Other objects and advantages will be apparent from the description, the accompanying drawings and the appended claims.

In the drawings,—

Fig. 1 is a view in elevation, with certain parts being shown in section of a device constructed in accordance with the present invention;

Fig. 2 is a plan view of the pusher plate and carrying arm, certain portions being shown in section;

Fig. 3 is a vertical sectional view on the line 3—3 of Fig. 2;

Fig. 7 is a detailed view showing a slightly modified latch construction; and

Figure 4:
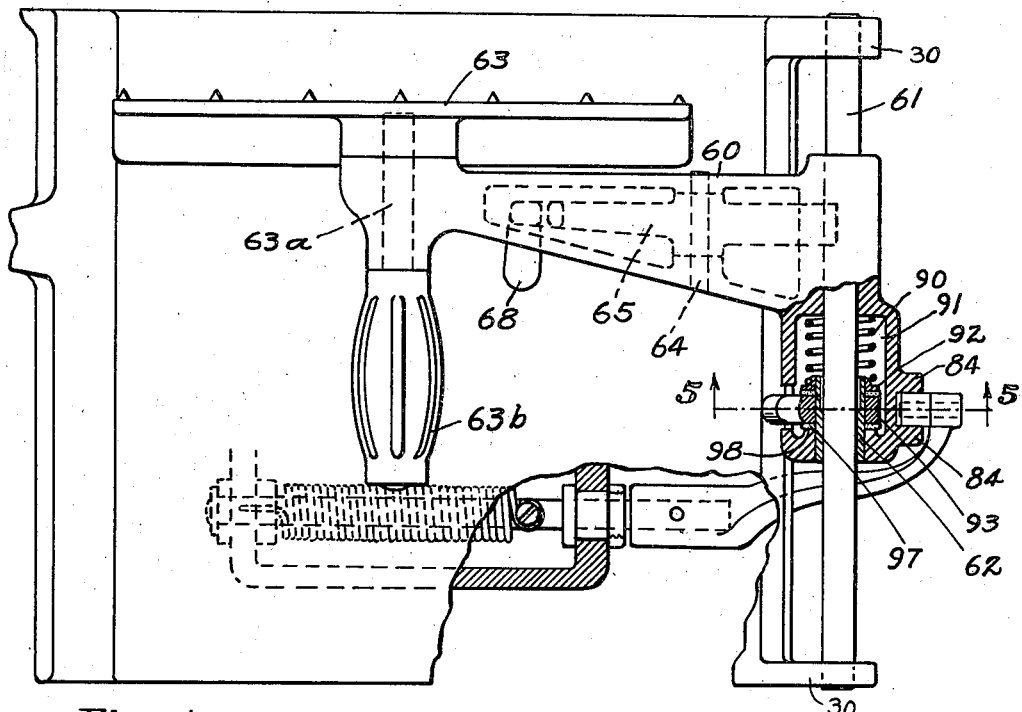
Fig. 4 is a plan view of a slightly modified construction showing the pusher plate and means providing for automatically advancing the work toward the cutting knife.

Referring to the drawings which illustrate a preferred embodiment of the invention, there is shown in Fig. 1 a work supporting carriage 10. For purposes of illustration, the invention will be illustrated and described with reference to the slicing machine construction disclosed in the application of David A. Meeker and John C. Slager, Serial No. 673,444, filed May 29, 1933 and assigned to the same assignee as this application, although the invention is equally applicable to other types of slicing machines. The machine comprises a gage plate 11, a rotary cutting knife 12, a guard plate 13, a main covered frame member 14, and a gage plate adjusting member 15. Rods 16 are provided which are covered by the main frame member 14, and an overhanging mounting 17 is slidably mounted upon the rods. The mounting 17 provides for the ready positioning and removal of the work supporting carriage through the cooperation of the pin and slot construction 18, and the attaching bolts 19. The carriage can be readily mounted upon the supporting member by means of the pin and slot construction and the bolts 19 then inserted and tightened so as to securely hold the work supporting carriage 10 for reciprocal movement past the cutting knife 12. The work supporting carriage 10 is provided with spaced extending lugs 30. These lugs are drilled to provide for supporting a pusher plate shaft 31. An arm 32 is rotatably and slidably journaled upon shaft 31 and provides a support for the shaft 33 to which is attached the pusher plate 34. A handle 35 extending in the opposite direction provides for the easy manipulation of the pusher plate by the operator. Both the handle 35 and the pusher plate are fixed to shaft 33 so that by rotating the handle, the pusher plate will be likewise rotated.

A cam member 38 is attached to the shaft 33 within the enclosing housing 39 formed integrally with arm 32 and is provided with a curved lifting surface as shown at 40.

The arm 32 is formed with downwardly extending marginal webs 42 which are suitably drilled intermediate the ends of the arm to provide a mounting for a pin 43. This pin carries a latch arm 44 which is provided with an end 45 forming a cam follower. This follower extends through an aperture in the lower side of housing 39 and into engagement with the cam surface 40. The opposite end 46 of the latch 44 is adapted to cooperate with the edge 47 of the carriage 10 to provide for the latching and retaining of the pusher plate out of the carriage and out of operative contact with the work material. A compression spring 48 normally urges the latch member into engaging position with the cam 40. Thus when the low point of the cam is in engagement with follower 45, spring 48 places the latch and associated parts in the position shown in Fig. 3. In this position the latch member 46 will engage the edge 47 of the carriage when the pusher plate assembly is lifted to a predetermined position above the carriage, and the pusher plate will be retained out of the carriage as shown. Upon rotation of cam 38 to cause the high point of its cam surface to engage follower 45, latch member 46 will not engage the carriage edge in any position of the pusher plate assembly.

In order to properly hold the pusher plate in its latched position out of the carriage, and to prevent objectionable bumping or jarring of the same incident to the reciprocation of the carriage, the arm 32 is provided with a downward extension 50 on which is formed a boss 51. The boss is drilled to provide for the mounting of a compression spring 52 and a contact member 53. A pin 54, fitted within the boss and cooperating with a reduced diameter portion 55 of the contact member, limits the axial movement of the contact member as urged by the spring. With the parts in latched position the contact member 53 will be brought into yielding engagement with the wall of the carriage 10 and this yielding contact will permit slight movement of the parts without knocking or bumping as the carriage is reciprocated in the cutting operation.

Preferably the cam member 40 is fixed to shaft 33 in predetermined angular relationship with respect to the pusher plate so that when the pusher plate is in normal position parallel with the bottom of the work supporting carriage (as shown in Fig. 1), the follower 45 will ride upon the high point of the cam. This results in the movement of the latch member 44 against the pressure of spring 48, and with the parts in this position, the pusher plate arm may be swung upwardly, and the end 46 of the latch member will not engage the edge of the carriage 47. Consequently the pusher plate will drop directly back into the carriage when released.

However, if the pusher plate shaft is so turned by means of handle 35 as to bring the follower opposite the low point of the cam when the pusher plate is in raised position, spring 48 will urge the latch member into the position shown in Fig. 3 where end 46 will latch over and engage the edge 47 of the carriage as the pusher plate is raised, and thereby the pusher plate will be held in inoperative position out of the carriage. In order to release the pusher plate from the latched position, it is only necessary to grasp the handle 35 and to turn the pusher plate in a clockwise direction as viewed in the drawings, to bring the high point of the cam under the cam follower, with a resultant pivotal movement of the latch member such as to cause disengagement with the edge 47 of the carriage.

Furthermore with the pusher plate in the work supporting carriage as shown in Fig. 1, if the handle is grasped to lift the pusher plate out of the carriage, and this is done without turning the handle in the arm 32, it is obvious that the high point of the cam will remain in contact with the follower 45 and the pusher plate will not latch in the uppermost position of the arm. Conversely, when the pusher plate is being raised out of the carriage, if the handle be so held that it does not rotate on its axis with respect to a fixed point, a relative rotation of shaft 33 in the arm 32 will occur such as to bring the low point of the cam opposite the follower so that when the pusher plate is raised sufficiently, latch member 46 will engage edge 47 of the carriage and latching will occur. Thus it is an easy matter for the operator to move the pusher plate into and out of the carriage as desired and, by a simple change of movement, to have it either return freely or to latch out of the carriage in inoperative position.

Figure 5:
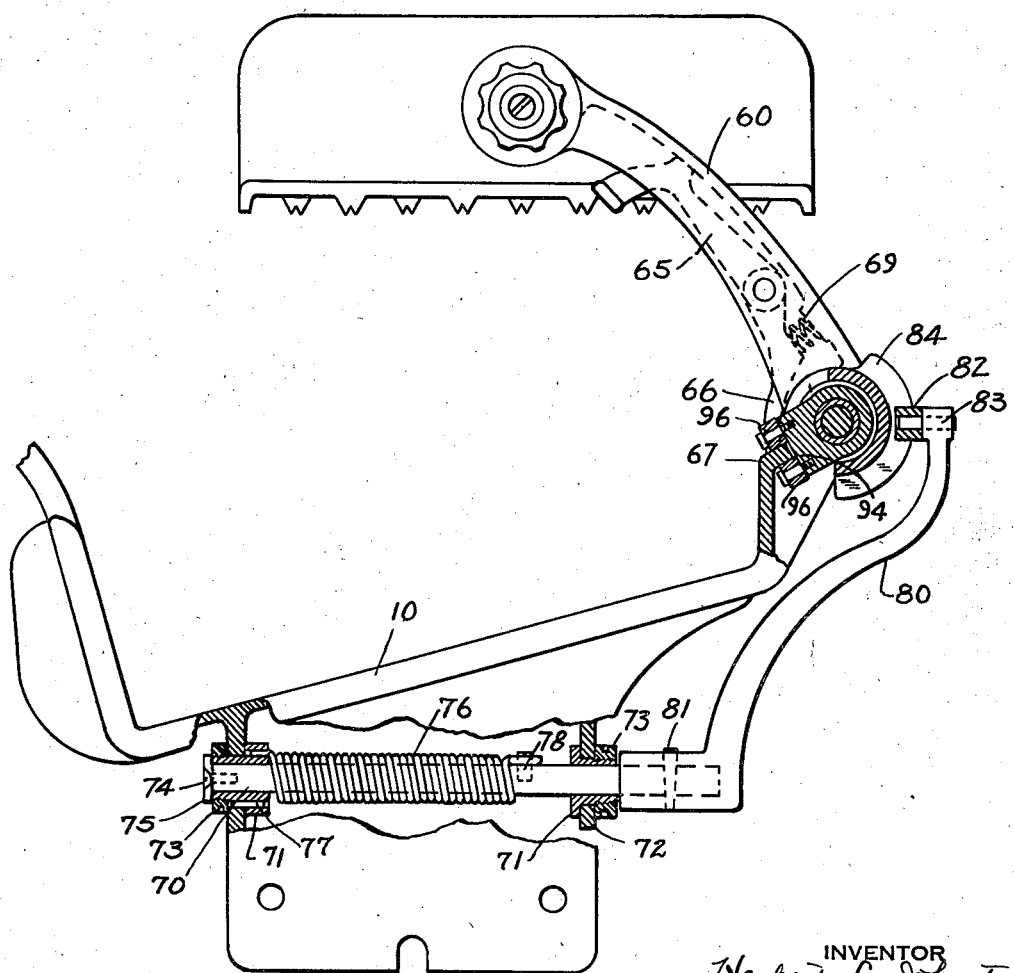
Fig. 5 is a view partially in elevation and partially in section on the line 5—5 of Fig. 4.

A somewhat modified construction is shown in Figs. 4 and 5. In this construction a pusher plate arm 60 is slidably and rotatably journaled upon the shaft 61 by means of bearings 62. The arm forms a support for a pusher plate 63, mounted upon shaft 63a, to which is also attached the handle 63b. The arm 60 carries a pin 64 upon which is mounted a latching member 65 having an end 66 adapted to engage the wall 67 of the carriage 10. The latching member 65 extends in close proximity to the handle 63b of the pusher plate, terminating in an operating part 68 in convenient position to be operated by the fore-finger of the hand that grasps the handle. As will be evident the latch will engage the carriage in the upper position of the pusher plate as shown in Fig. 5, and can be readily disengaged by downward pressure upon the latch member 65 by the operator. A spring 69 normally urges the latch member into latch engaging position, and this spring is compressed manually upon the unlatching of the device.

Means are likewise provided for feeding the work material toward the cutting knife. This means comprises a shaft 70 which is mounted in bearing members 71 in the lower supporting web 72 of the work carriage 10. The bearing sleeves 71 are suitably threaded to provide for receiving nuts 73 which are adapted to retain the bearing members in proper operating position. The shaft 70 is drilled to provide for receiving a screw 74 carrying washer 75 which is adapted to overlie the end of the shaft and to provide for the proper adjustment thereof. A coil spring 76 surrounds the shaft, the end of the spring being fixedly retained in bearing member 71 which is itself suitably pinned as at 77 to the web 72 to prevent rotation thereof. The opposite end of the coil spring 76 is attached to the shaft 70 by a screw 78. The spring and bearings for the shaft are positioned beneath the carriage so that they will not be exposed to food particles and a highly sanitary condition will thereby be maintained.

Shaft 70 overhangs the bearing 71 at one end to provide for receiving an operating arm 80 which is attached to the shaft by any convenient means such as a pin 81. Arm 80 extends upwardly toward the pusher plate shaft 61 and is provided at its end with a roller 82 suitably mounted upon pin 83. The pusher plate arm 60 is provided with integral spaced arcuate surfaces 84 which are adapted to engage opposite sides of the roller 82 in an antifriction manner. The surfaces 84 are of sufficient angular extent that they engage roller 82 throughout the full pivotal movement of the pusher plate arm about shaft 61.

Suitable tension is provided in the spring 76 to cause the arm 80 to normally urge the roller 82 against the surface 84 in such a manner as to tend to urge the pusher plate toward the cutting knife. This tension can be readily varied to suit the wishes of the individual operator, and in accordance with the frictional characteristics of the different material treated, but preferably it is made sufficiently great so that the pusher plate will actually carry the work material forward and into contact with the knife, each time that a slice is cut off, the pusher plate advancing the work by the amount of the depth of the slice. By reason of the arcuate shape of the members 84, the advancing means remains effective regardless of the thickness of the material being sliced and the consequent angular position of the pusher plate.

When the carriage is reciprocated past the cutting knife it may accidentally be moved to the limit of its travel and bumped against a stop member. This bumping action might result in the lifting of the pusher plate out of engagement with the work material and in this case the operating arm 80 would swing the pusher plate forward and toward the cutting knife. To prevent such occurrence, means are preferably provided for resisting the movement of the pusher plate from its contact with the work material. As illustrated in Figs. 4 and 5 this mechanism comprises a spring 90 mounted in a recessed portion 91 of the pusher plate arm 60, cooperating with a washer 92 mounted upon the bearing member 62. A sleeve 93 is rotatably mounted upon the bearing member 62, and is provided with a face 94 extending closely adjacent the edge 67 of the carriage. A pair of rollers 96 is attached to the face 94 so that their adjacent faces lie directly above and below the wall 67. This construction provides for the axial movement of the member 93 along shaft 61 with the pusher plate arm, while preventing any rotational movement thereof about the shaft 61. The rollers 96 readily permit longitudinal movement without substantial friction. A frictional disk 97 is mounted between the member 93 and the end portion 98 of the pusher plate arm. As spring 91 urges the sleeve 93 and the frictional disc against arm 98, frictional resistance will be interposed to relative angular movement between these parts and the pusher plate will as a result tend to remain in any preadjusted angular position. Its free motion longitudinally of shaft 61, however, is not interfered with.

When therefore the pusher plate is placed in contact with the work material in the carriage, the carriage may be reciprocated and even if bumping does occur, the above described construction, in addition to the weight of the arm itself, functions to prevent raising of the pusher plate out of contact with the work. Consequently the work advancing arm 80 will cause the regular advancing of the work toward the cutting knife in the desired manner. The pusher plate can be lifted clear of the material in the carriage by the operator, exerting sufficient force to overcome the frictional resistance. If desired sufficient frictional resistance may be provided, as by proper selection of the strength of spring 91 and the characteristics of the frictional members, to hold the pusher plate against gravity in any position in which it is manually placed.

Figure 6:
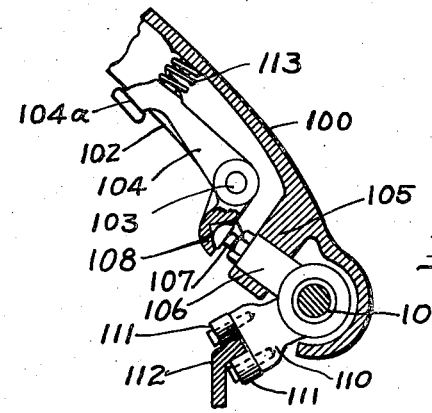
Fig. 6 is a detail view showing a modification of the arrangement of Figs. 4 and 5.

In Fig. 6 a slightly modified construction of frictional device is shown. In this construction the pusher plate arm 100 is rotatably and slidably mounted as above described upon the shaft 101. It is also provided with downwardly extending webs 102 in which pin 103 is mounted. This pin provides for the mounting of an arm 104 which terminates in an operating part 104a within easy reach of the hand of the operator grasping the pusher plate handle.

The arm 100 is likewise provided with a boss 105 which is drilled to receive a movable frictional device or brake shoe 106. An adjustable pin 107 is mounted in the member 106 in such position that its head extends into a grooved portion 108 of the arm 104. A cooperating frictional member 110 is slidably mounted on shaft 101 and is arranged to be moved axially of the shaft with the pusher plate arm but is prevented from rotational movement therewith through the action of rollers 111 engaging the wall of the carriage 112.

The operation of this construction will be readily apparent from the above description. Spring 113 normally causes rotation of arm 104 about its pivot point in such a manner as to bring the frictional member 106 into engagement with the cooperating member 110. This engagement may be regulated by pin 107 and preferably is such as to maintain the pusher plate arm in any preadjusted position. When, however, it is desired to adjust the pusher plate arm angularly, it is only necessary to exert a slight lifting pressure upon member 104a which will cause a disengagement of the frictional members 106, 110, and permit free rotational movement thereof. Free longitudinal movement is permitted at all times. It will be understood that this construction may be used with the work advancing arm 80 if desired.

In place of the cooperating latching constructions 46, 47, of Fig. 3, and 66, 67 of Fig. 5, the arrangement shown in Fig. 7 may be used. In this arrangement the edge 120 of the carriage is formed with a receding sloping surface as indicated so that upon a very severe pressure being exerted upon the pusher plate, the end 121 of the latch member will slip off of the edge 120 to permit a release of the pusher, and thereby to prevent breakage or damage to these parts. In any normal operation of the device, however, the engagement of these surfaces would be sufficient to maintain the pusher plate in inoperative latched position.

Figure 8:
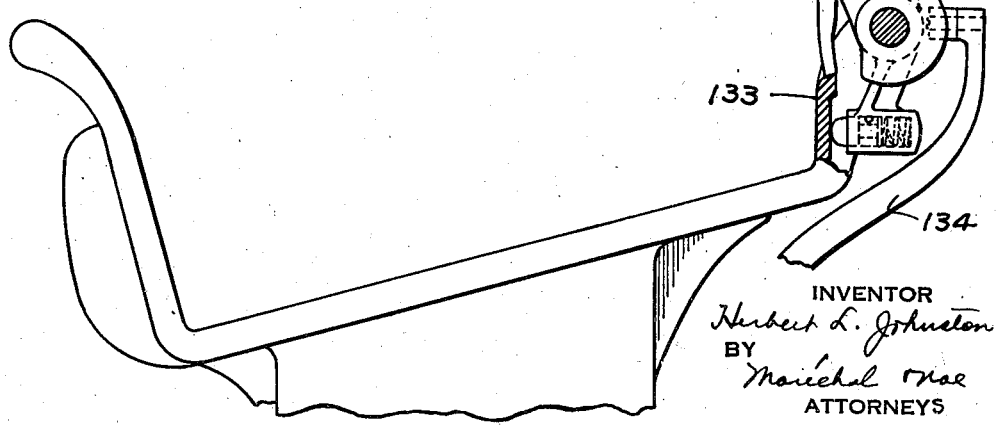
Fig. 8 is a view partially in elevation and partially in section showing the application of the automatic feeding arrangement to the construction of Figs. 1 to 3.

Fig. 8 shows a further modification in which the latching construction as disclosed in Figs. 1 to 3 and comprising the arm 130, the cam member 131, and the latch 132 cooperating with the carriage wall 133 for retaining the pusher plate in predetermined adjusted position out of the carriage, are combined with the work advancing arm 134 and the accompanying arcuate engaging surfaces 145. The work advancing arm has not been shown in all its details, as its construction is obvious from the showing in Figs. 4 and 5. When the pusher plate is in engagement with the material in the carriage, the advancing arm will act to feed the material toward the cutting knife; and when latched in inoperative position, the pusher plate assembly will be returned to its innermost position adjacent the knife where it will interfere the least with further slicing operations.

While the forms of apparatus herein described constitute preferred embodiments of the invention, it is to be understood that the invention is not limited to these precise forms of apparatus, and that changes may be made therein without departing from the scope of the invention which is defined in the appended claims.

What is claimed is:

1. In a slicing machine of the character described the combination of a base, a rotary knife, a carriage for supporting the work material, means for mounting said carriage for movement past said knife, a pusher plate, means for pivotally supporting said pusher plate in said carriage to provide for movement thereof from an operative position in engagement with the work material to an inoperative position out of engagement therewith, means effective throughout substantially the range of pivotal movement of the pusher plate for yieldingly resisting pivotal movement of said pusher plate in either direction from a predetermined adjusted position, and operable means carried by said pusher plate supporting means and under the control of the operator during the slicing operation for selectively releasing said resisting means, to permit of free movement of said pusher plate, and restoring the action thereof.

2. In a slicing machine of the character described the combination of a base, a rotary knife, a carriage for supporting the work material, means for mounting said carriage for movement past said knife, a pusher plate having a handle, means for supporting said pusher plate from said carriage to provide for swinging movement thereof from an operative position in contact with the work material to an inoperative position, releasable friction elements effective throughout substantially the range of swinging movement of the pusher plate for opposing movement in either direction of said pusher plate, and control means carried by said pusher plate supporting means and directly operable by the hand of the operator which holds said handle for releasing said friction elements to allow free movement of the pusher plate.

3. In a slicing machine of the character described the combination of a base, a rotary knife, a carriage for supporting the work material, means for mounting said carriage for movement past said knife, a pusher plate having a handle, a pusher plate arm, means for supporting said pusher plate arm on said carriage to provide for sliding and rotational movement thereof, means carried by said pusher arm and cooperating with said carriage for opposing movement of said pusher plate from any adjusted position, in its range of rotation movement, and releasing means carried by said pusher plate arm and directly under the control of the operator during operation of said pusher plate handle for releasing said opposing means.

4. In a slicing machine of the character described the combination of a base, a rotary knife, a carriage for supporting the work material, means for mounting said carriage for movement past said knife, a pusher plate, a pusher plate arm, means for supporting said pusher plate arm from said carriage to provide for swinging movement thereof with respect to said carriage, a latch member adapted to engage a portion of said carriage at a point spaced from said pusher plate supporting means in a predetermined swinging position of said pusher plate to retain the pusher plate in predetermined adjusted position, resilient means carried by said pusher plate arm on the opposite side of said pusher plate supporting means from said pusher plate arm and effective between said pusher plate arm and the carriage tending to cause rotation of said pusher plate arm about its support to thereby yieldingly maintain said latch member in latch engaging position, and means for releasing said pusher plate from its inoperative position.

5. In a slicing machine of the character described the combination of a base, a rotary knife, a carriage for supporting the work material, means for mounting said carriage for movement past said knife, a pusher plate, a pusher plate shaft, a handle attached to said shaft for operation of said pusher plate, a pusher plate arm for supporting said shaft and pusher plate, means for mounting said pusher plate arm for slidable and swinging movement with respect to said carriage, a latch member carried by said pusher plate arm and adapted to engage a portion of said carriage to retain the pusher plate in predetermined adjusted position, a cam mounted on said pusher plate shaft, said latch member having a follower in operative engagement with said cam to provide for the release of said latch upon rotation of said pusher plate shaft and said cam by said handle.

6. In a slicing machine of the character described the combination of a base, a rotary knife, a carriage for supporting the work material, means for mounting said carriage for movement past said knife, a pusher plate, means for supporting said pusher plate for swinging movement from an operative position in engagement with the work material in said carriage to an inoperative position out of said carriage, a pusher plate handle mounted for rotational movement with respect to said supporting means, means for retaining said pusher plate in said inoperative position, and means operable in response to said rotational movement of said handle for releasing said retaining means.

7. In a slicing machine of the character described the combination of a base, a rotary knife, a carriage for supporting the work material, means for mounting said carriage for movement past said knife, a pusher plate, a pusher plate arm, means for supporting said pusher plate arm providing for swinging movement of the pusher plate from an operative position in engagement with the work material to an inoperative position out of engagement therewith, a handle for said pusher plate rotatable with respect to said pusher plate arm, means for retaining the pusher plate in inoperative position above said carriage, and means carried by said pusher plate arm and operated upon rotational movement of said pusher plate handle for effecting release of said retaining means to provide for lowering said pusher plate into its operative position.

8. In a slicing machine of the character described the combination of a base, a rotary knife, a carriage for supporting the work material, means for mounting said carriage for movement past said knife, a pusher plate having a handle, a pusher plate arm for rotatably supporting said pusher plate, means for supporting said pusher plate arm for swinging movement about an axis spaced from that of said handle to provide for swinging said pusher plate from an operative position in engagement with the work material to an inoperative position, latch mechanism for retaining said pusher plate in inoperative position, and operating means for said latch mechanism carried by said pusher plate arm and actuable upon movement of said pusher plate handle with respect to said pusher plate arm providing for the latching of said pusher plate in inoperative position when swung from operative position when the pusher plate handle is held to produce relative movement of the pusher plate with respect to the pusher plate arm to maintain the pusher plate handle substantially without angular change with reference to a fixed point, and providing for free swinging movement of the pusher plate throughout its extent of movement when substantially no movement of said pusher plate handle in said pusher plate arm takes place from the relative position of these parts in the operative position of the pusher plate.

9. In a slicing machine of the character described the combination of a base, a rotary knife, a carriage for supporting the work material, means for mounting said carriage for movement past said knife, a shaft on said carriage substantially normal to the plane of said knife, a pusher plate, an arm supporting said pusher plate and mounted on said shaft for movement along said shaft toward and away from the plane of said knife and for movement around said shaft to provide for swinging movement of the said pusher plate into and out of said carriage, a member slidable longitudinally of said shaft with said pusher plate arm, means continuously engaging said carriage throughout the longitudinal movement of said member for preventing rotational movement thereof, friction means movable with said arm and effective to resist swinging movements of said pusher plate and said arm, means normally urging said member and said friction means into frictional engagement to oppose rotational movements of said pusher plate arm, and control means on said arm for releasing the pressure on said friction means.

10. In a slicing machine of the character described the combination of a base, a rotary knife, a carriage for supporting the work material, means for mounting said carriage for movement past said knife, a pusher plate, a pusher plate arm, means for supporting said pusher plate arm providing for swinging movement of the pusher plate from an operative position in contact with the work material to an inoperative position, a handle for said pusher plate rotatable with respect to said pusher plate arm, a latch mechanism for retaining the pusher plate in inoperative position, and operative means for said latch mechanism actuable upon rotation of said pusher plate handle with respect to said pusher plate arm providing for the latching of said pusher plate in inoperative position when the pusher plate handle is maintained in substantially fixed angular position with respect to a fixed point during swinging of said pusher plate to its inoperative position, and providing for free swinging movement of said pusher plate throughout its extent of swinging movement when said pusher plate handle is maintained in substantially fixed relative position with respect to said pusher plate arm.

HERBERT L. JOHNSTON.

CERTIFICATE OF CORRECTION.

Patent No. 2,151,852. March 28, 1939.

HERBERT L. JOHNSTON.

It is hereby certified that error appears in the printed specification of the above numbered patent requiring correction as follows: Page 3, second column, line 37, for reference numeral "145" read 135; page 4, first column, line 26, claim 3, after the word "pusher" insert plate; line 28, after "position" strike out the comma; line 29, same claim 3, for "rotation" read rotational; and that the said Letters Patent should be read with this correction therein that the same may conform to the record of the case in the Patent Office.

Signed and sealed this 2nd day of May, A. D. 1939.

Henry Van Arsdale (Seal) Acting Commissioner of Patents.